(12) United States Patent
Wallace

(10) Patent No.: US 7,779,431 B2
(45) Date of Patent: Aug. 17, 2010

(54) NETWORKED SPREADSHEET TEMPLATE DESIGNER

(76) Inventor: Robert G. Wallace, 1919 Berkeley Ave., Saint Paul, MN (US) 55105

( * ) Notice: Subject to any disclaimer, the term of this patent is extended or adjusted under 35 U.S.C. 154(b) by 1243 days.

(21) Appl. No.: 11/184,715

(22) Filed: Jul. 18, 2005

(65) Prior Publication Data

US 2006/0015806 A1   Jan. 19, 2006

Related U.S. Application Data

(60) Provisional application No. 60/588,689, filed on Jul. 16, 2004.

(51) Int. Cl.
*G06F 3/00* (2006.01)
*G06F 3/048* (2006.01)
(52) U.S. Cl. .................. 719/331; 715/804; 715/700
(58) Field of Classification Search ................ 719/331; 715/212, 804, 700
See application file for complete search history.

(56) References Cited

U.S. PATENT DOCUMENTS

| | | | |
|---|---|---|---|
| 5,293,615 A * | 3/1994 | Amada | 707/4 |
| 5,566,330 A | 10/1996 | Sheffield | |
| 5,883,623 A | 3/1999 | Cseri | |
| 5,966,716 A | 10/1999 | Comer et al. | |
| 6,341,292 B1 | 1/2002 | Cho et al. | |
| 6,640,234 B1 | 10/2003 | Coffen et al. | |
| 6,725,422 B1 | 4/2004 | Bauchot et al. | |
| 7,370,271 B2 * | 5/2008 | Killen et al. | 715/212 |
| 2002/0129054 A1 * | 9/2002 | Ferguson et al. | 707/503 |
| 2004/0088650 A1 | 5/2004 | Killen et al. | |
| 2004/0103366 A1 | 5/2004 | Peyton-Jones et al. | |
| 2004/0111666 A1 | 6/2004 | Hollcraft | |

OTHER PUBLICATIONS

Actuate Corporation, *e.Spreadsheet Designer*, Copyright 2004, 5 pages.
Alenz, *Spreadsheet Management System*, Copyright 2002, Balenz Software, Inc., 11 pages.
iLevel Software, *iLevel Software: XML/SGML Document Management*, 7 pages.
MicroSoft Office Online, *Creating a data entry form with the Excel Template Wizard*, Copyright 2004, 2 pages.

* cited by examiner

*Primary Examiner*—Lechi Truong

(57) ABSTRACT

A networked spreadsheet template designer allows administrators to easily create and deploy robust reporting and input applications that leverage existing spreadsheet templates and knowledge in an easy to use user interface. Templates are created to operate directly in the particular spreadsheet program environment and can be created using existing templates and modeling workbooks of that spreadsheet program without the need for any code to be written. The template designer uses dynamic link library (DLL) worksheet functions directly on template worksheets to perform specified actions. The DLL functions enable a user to create an interactive, custom application by automating/encapsulating complex tasks. The DLL functions are managed across a computer network through an administrator interface to create the functions and a viewer interface that combines an Explorer® window to select the functions and a spreadsheet window for the actual spreadsheet program that implements the DLL functions.

12 Claims, 6 Drawing Sheets

| File | Description |
|---|---|
| *AppName*.xla | The main application Excel addin that contains all driver references to SSO base product functions. This file may be customized to add or modify features. |
| *AppName*.vws | This file contains all view definitions for the application. This is a system-generated file that should not be modified outside of the application. |
| *AppName*.msg | This file contains the basic error handling messages for the application. This file may be modified to support custom messaging added to the application Excel addin. |
| *AppName*.tbr | This file contains the SSO application toolbar definition. Entries may be deleted to remove items from the toolbar or added to invoke custom functions. |
| Sso.dll | The main SSO dll that contains all base product functions. |
| *Templates*.xls | This file contains the templates for the SSO application. An application may contain multiple template workbooks. |
| *Templates*.ini | This file contains the property information for the associated template workbook. This file must have the same name (except for the extension) as the associated template workbook. An application may contain multiple template property files. |

Fig. 4

| File | Location |
|---|---|
| *AppName*.xla | %SSO%\App\AppName\System\AppName.xla |
| *AppName*.vws | %SSO%\App\AppName\System\AppName.vws |
| *AppName*.msg | %SSO%\App\AppName\System\AppName.msg |
| *AppName*.tbr | %SSO%\App\AppName\System\AppName.tbr |
| Sso.dll | %SSO%\App\AppName\System\SSO.dll |
| *Templates*.xls | %SSO%\App\AppName\*Templates*.xls |
| *Templates*.ini | %SSO%\App\AppName\*Templates*.xls |

Fig. 5

| Change/Action | Deployment Files |
|---|---|
| Change Microsoft Excel formatting on a template worksheet | *.XLS |
| Change template or workbook property settings | *.INI |
| Change Essbase addin sheet options | *.INI |
| Add a new view to an existing template workbook | *.XLS<br>*.INI<br>*.VWS |
| Remove an existing view from a template workbook | *.VWS |
| Add, remove or change Group View settings | *.VWS |
| Add custom template properties | *.INI |
| Add view level custom code (code behind the sheet) | *.XLS |
| Add application level custom code | *.XLA |
| Modify a toolbar file | *.TBR |

Fig. 6

NETWORKED SPREADSHEET TEMPLATE DESIGNER

RELATED APPLICATION

The present application claims the benefit of U.S. Provisional Application No. 60/588,689 filed Jul. 16, 2004, which is incorporated herein in its entirety by reference.

FIELD OF THE INVENTION

The present invention relates to data processing in terms of presentation and cell control processing of spreadsheet documents. More particularly, the present invention relates to a networked system for creating and invoking an interactive and custom library of complex worksheet functions within the existing template function of a spreadsheet program to more effectively provide for template and report generation in a business organization.

BACKGROUND OF THE INVENTION

In today's business world it is desirable, in order to save time and money, to have spreadsheets customized to a business's individual needs. One solution to this is creating spreadsheet templates by writing code. However, most business users do not have the necessary programming knowledge and code writing is a time-consuming process. Another option is to create a template within a spreadsheet, such as Microsoft Excel®, by using native Excel® functions. This, however can also be a time consuming process as most Excel® functions can only perform rudimentary commands on the spreadsheet and many commands may be necessary to customize a template to a business's needs. A third option is to purchase templates from a company that specializes in creating them. However, it may be difficult to obtain a template that meets the exact needs of a business and it may also be difficult to obtain a customized template in a timely fashion if a deadline is approaching.

Several software applications deal with creating spreadsheet templates. For example, iLevel™ Software allows the creation of templates from various authoring tools, e.g., FrameMaker™ or Microsoft Word®, while using the commands native to that particular application. Another example is the Actuate®. e.Spreadsheet designer, which allows for creation of Microsoft Excel® templates using menu options and wizards in an environment that closely resembles, but is not actually executed as part of, the Excel® application itself. Instead, a report generator program is executed against a database and set of virtual functions created by the template environment to produce an actual, expanded and resolved Microsoft Excel® spreadsheet as described in more detail, for example, in U.S. Publ. Appl. No. 2004/0088650A1 now U.S. Pat. No. 7,370,271.

There are many patents and published patent applications directed towards spreadsheet creation. For example, U.S. Pat. No. 5,883,623 is directed toward a general spreadsheet, including a method for building custom spreadsheet applications and U.S. Pat. No. 5,966,716 includes a template "wizard." U.S. Pat. Nos. 6,640,234 and 6,725,422 are directed toward automatically applying formulas and cell addresses to a range of cells in a spreadsheet. U.S. Publ. Appl. No. 2004/0111666A1 having Ser. No. 10/425,088, now abandoned, describes a report replicator program for a spreadsheet that permits a user to more easily replicate portions of a report that are repeated within a spreadsheet to accommodate the actual data in a final report. U.S. Publ. Appl. No. 2004/0103366A1, now U.S. Pat. No. 7,266,763, describes a user-defined function definition feature extension for the Microsoft Excel® spreadsheet program. There are also several patents directed towards sharing automatically updating spreadsheets on a database as described for example, in U.S. Pat. Nos. 6,341,292 and 5,293,615.

While there have been substantial improvements in spreadsheets for presenting and managing data, it would be desirable to provide for a more efficient and effective way to create templates for a spreadsheet, particularly in a networked business environment.

SUMMARY OF INVENTION

The present invention is a networked spreadsheet template designer that allows administrators to easily create and deploy robust reporting and input applications that leverage existing spreadsheet templates and knowledge in an easy to use user interface. Templates are created to operate directly in the particular spreadsheet program environment, such as Microsoft Excel®, and can be created use existing templates and modeling workbooks of that spreadsheet program without the need for any code to be written. The present invention includes a library of dynamic link library (DLL) worksheet functions that makes creation of templates a faster, simpler task. The template designer uses these DLL worksheet functions directly on template worksheets to perform specified actions. The DLL functions enable a user to create an interactive, custom application by automating/encapsulating complex tasks. The DLL functions are managed across a computer network through an administrator interface 103 to create the functions and a viewer interface that combines an Explorer® window to select the functions and a spreadsheet window for the actual spreadsheet program that implements the DLL functions.

In a preferred embodiment, the DLL functions are close in nature to Microsoft Excel® functions, but are more detailed and can perform more complex commands. A single DLL function may encapsulate the equivalent of 20-30 individual Excel® functions, enabling templates to be formatted much faster and easier than if done using Excel® commands.

Preferably, the DLL function interface is accessed through an administrator console. When a template workbook is opened, the Insert Function icon is located in the middle pane of the administrator console. Double-clicking the Insert Function icon shows the list of available DLL functions. After a function is selected, a menu appears for selection of the parameters that the function will apply to. When the desired parameters have been set, selecting "Paste" will place the command on the template worksheet. More commands can be added by clicking "Back" to return to the main list of functions.

The present invention allows multiple network users to access the templates that are created with the administrator console. The administrator sends each application and its associated templates to the deployment server where copies are stored. Security options allow the administrator to limit the clients who may access any individual application. Users who are allowed access are then able to view and manipulate the templates through the server using the viewer interface.

A computer-readable medium storing thereon computer-readable instructions for generating and managing templates for a spreadsheet program is also provided. The computer-readable medium comprises instructions for using an administrator interface module operably connected to a server computer to design a plurality of templates for the spreadsheet program based at least in part on existing templates, functions and modeling workbooks of the spreadsheet program without any code being written. The computer-readable medium further comprises instructions for making a library of dynamic link library (DLL) worksheet functions corresponding to the plurality of templates available over the computer network. The computer-readable medium also comprises instructions for using a user interface module executing on a client computer having a first explorer window in which the user views and selects the DLL worksheet functions and a second viewer window in which the user interacts with the spreadsheet program and selectively incorporates one or more of the selected DLL worksheet functions.

BRIEF DESCRIPTION OF THE DRAWINGS

FIG. 4 is a table of a application files for a preferred implementation of the present invention referred to as SpreadsheetObjects.

FIG. 5 is a table identifying the specific deployment source folder location of each application file relative to the SpreadsheetObjects system path (%SSO%).

FIG. 6 is a deployment impact table describing different scenarios and the impacted application files that must be re-deployed to the server repository to properly update the end user's machine.

DETAILED DESCRIPTION OF THE PREFERRED EMBODIMENTS

Figure 1:
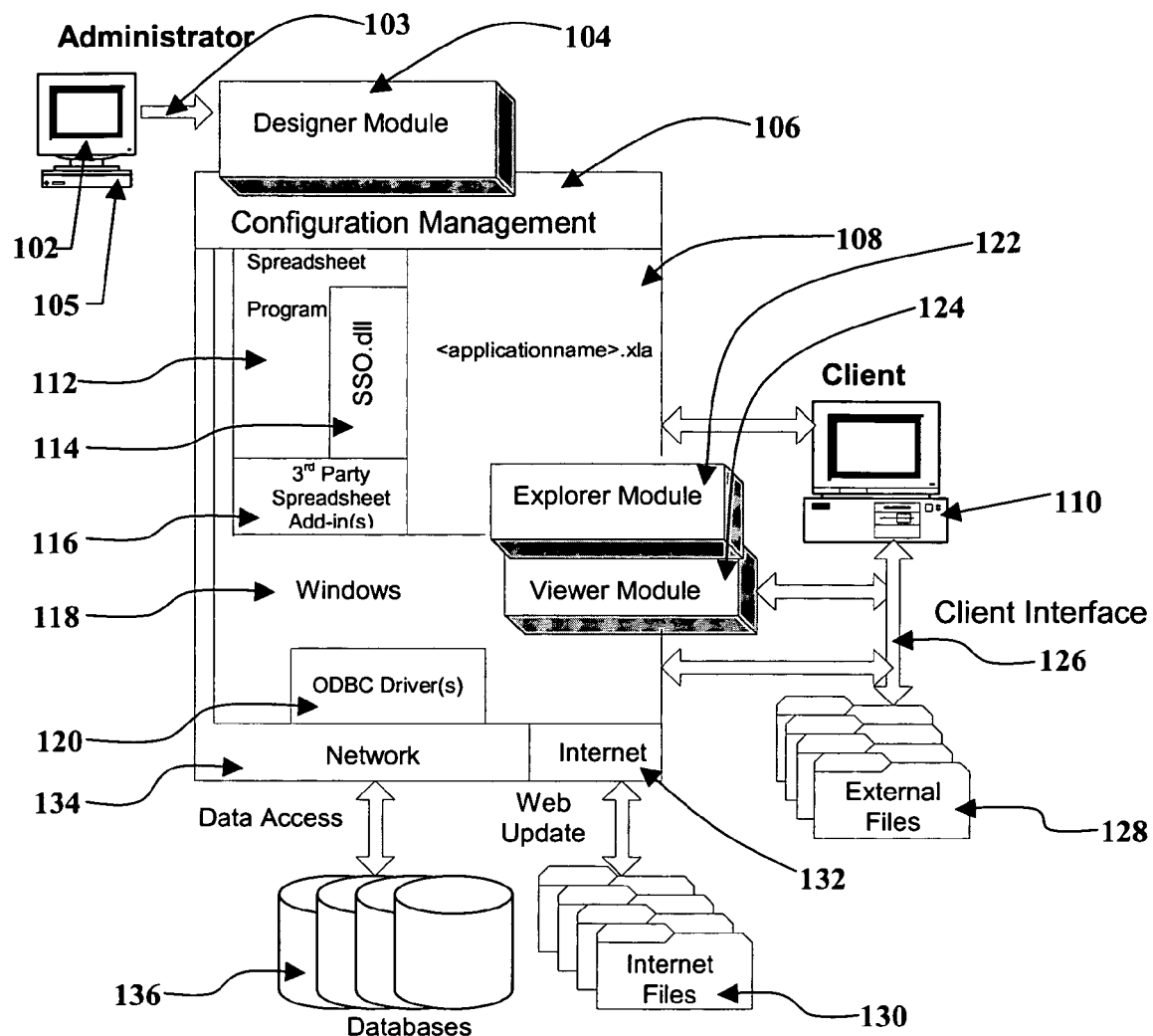
FIG. 1 illustrates the relationship between the components of the preferred embodiment of the present invention.

FIG. 1 illustrates the relationship between the different components of the preferred embodiment of the present invention, which will be referred to as "SpreadsheetObjects." The invention includes an administrator 102, an administrator interface 103, configuration management system 106, and a designer module 104. The designer module 104 enables the administrator 102 to design report templates and applications 108 and store them on a deployment server 105. A client interface 126 enables a client 110 to view external files 128 and view and manipulate the report templates and applications 108 through the use of an Explorer module 122 and a Viewer module 124. A SpreadsheetObjects program 114 interacts with a spreadsheet program 112 and optional 3$^{rd}$ party spreadsheet add-ins 116 in a Windows®-based operating system 118. Open Database Connectivity (ODBC) drivers 120 link a database management system through the network 134 to local or remote databases 136, and a web update system keeps program files current by linking the most current versions of the programs stored in internet files 130 via the internet 132.

In this preferred embodiment as shown in FIG. 1, an administrator 102 manages the source SpreadsheetObjects applications including the templates or views that are accessed by the clients 110 over a computer network, such as a computer network for a business organization. An administrator console is used to manage version control and deployment to the server repository. This process must be completed before any clients 110 can access the templates. The administrator 102 may also need to manage OLAP security specific to the deployed SpreadsheetObjects applications 108 to ensure that the correct client privileges are in place. The administrator 102 may also need to manage OLAP security specific to the deployed SpreadsheetObjects applications 108 to ensure that the correct privileges are in place.

The deployment server 105 is the physical computer system that stores SpreadsheetObjects applications that have been deployed by the administrator 102. The deployment server 105 stores compressed copies of all application files and distributes these application files to client computers on version control settings. The deployment server 105 is typically an existing OLAP or file server.

Clients 110 with access are then able to view and manipulate SpreadsheetsObjects templates and applications 108 through the Client Viewer Module 124. The Viewer module 124 is the client software that allows users to view and manipulate SpreadsheetObject templates and applications 108, and is accessed over the network 134 through a web launch mechanism. This web launch mechanism also automatically provides web updates to the applications 108. The Viewer 122 operates in client/server mode using Excel® as the user interface and a TCP/IP connection through an Intranet, dial-up connection or secure VPN connection to the OLAP server for data access.

In a preferred embodiment, SpreadsheetObjects uses Microsoft Excel® as its primary user interface, but augments it with custom dialogs to implement all of the needed user data presentation services. The use of Excel® with custom dialogs offers several advantages over a full custom interface or browser interface. Excel® is by far the desktop tool of choice for data organization and analysis. The majority of users are already very proficient with it and will not require extensive training. Second, Excel® has extensive data analysis, graphics, and formatting capabilities that would be difficult to improve upon, or match, in a custom interface. Excel® also provides a very complete set of support services such as printing and data import/export. The use of Excel® with custom dialogs as provided by the present invention also allows users to integrate their own existing or custom created macros into their analysis, and send data seamlessly to other Microsoft Office® applications for presentation or transport purposes. Excel® is also almost universally installed on user's machines and is supported by Microsoft. Furthermore, the existing Excel® user base is so large that it will not be obsoleted without considerable advance notice. Finally, Excel® file formats are compatible with the vast majority of other analysis tools.

The extensions of the present invention that add the custom dialogs to Excel® are preferably implemented as ActiveX Dynamic Link Libraries (DLLs). These ActiveX DLLs are dynamically registered when a SpreadsheetObjects application is started. This allows SpreadsheetObjects to be easily updated or patched without a re-installation or manual registration of DLLs.

In addition to the use of Excel®, a small application is used to initiate the program and handle user validation. Once the application is initiated, the majority of the interaction with the user is through Excel®.

Figure 2:
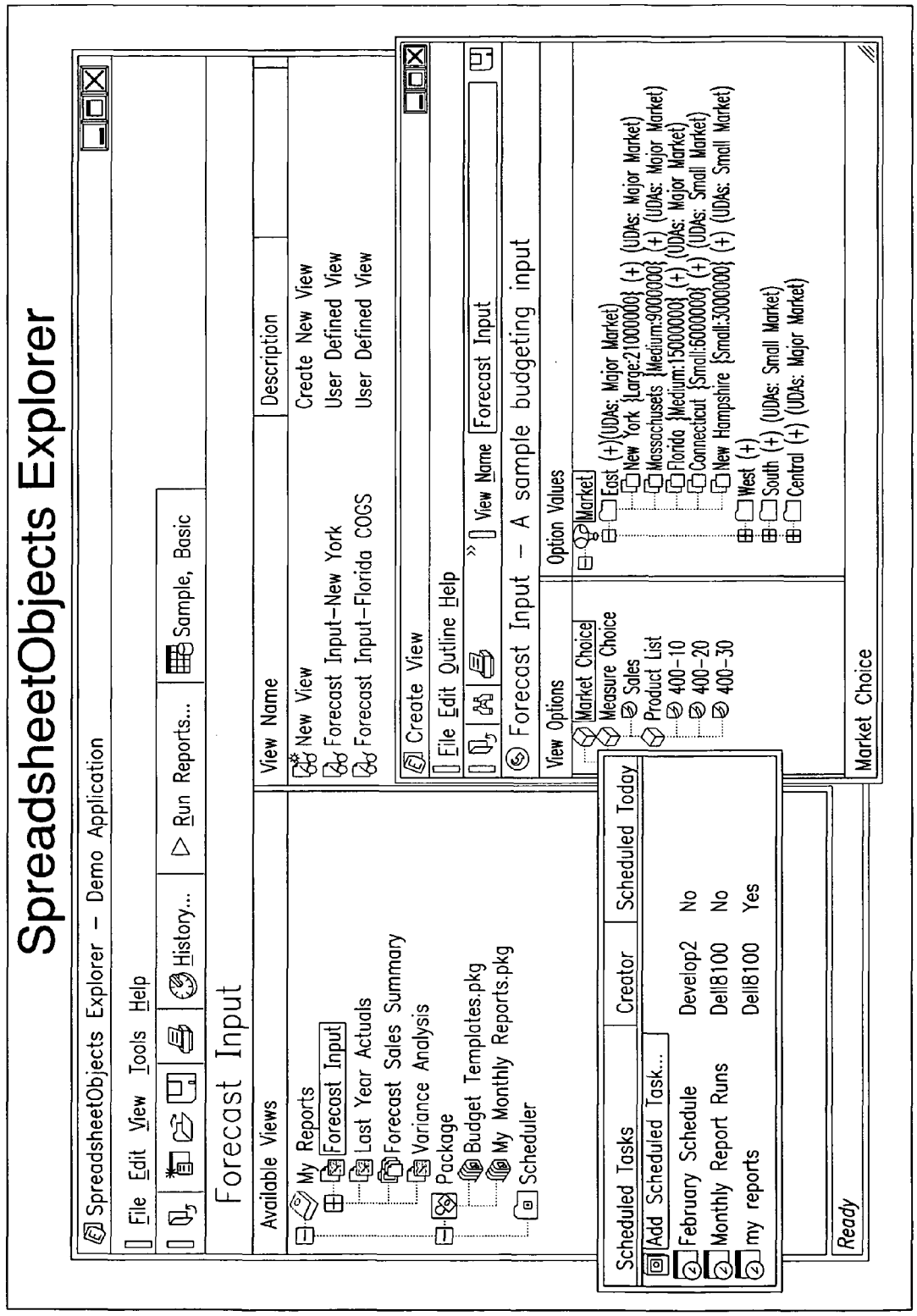
FIG. 2 is a screen shot of the preferred embodiment of the Explorer window of the user interface.

The preferred embodiment of the Explorer module 122, shown in FIG. 2, works in the Viewer 124 to give users focused and personalized views in a familiar Excel® setting. The Explorer 122 shields users and clients 110 from complex technology and streamlines their activities. Interactive business processes are fully supported with features such as write-back, cell notes, on-line auditing and automatic database calculations.

Figure 3:
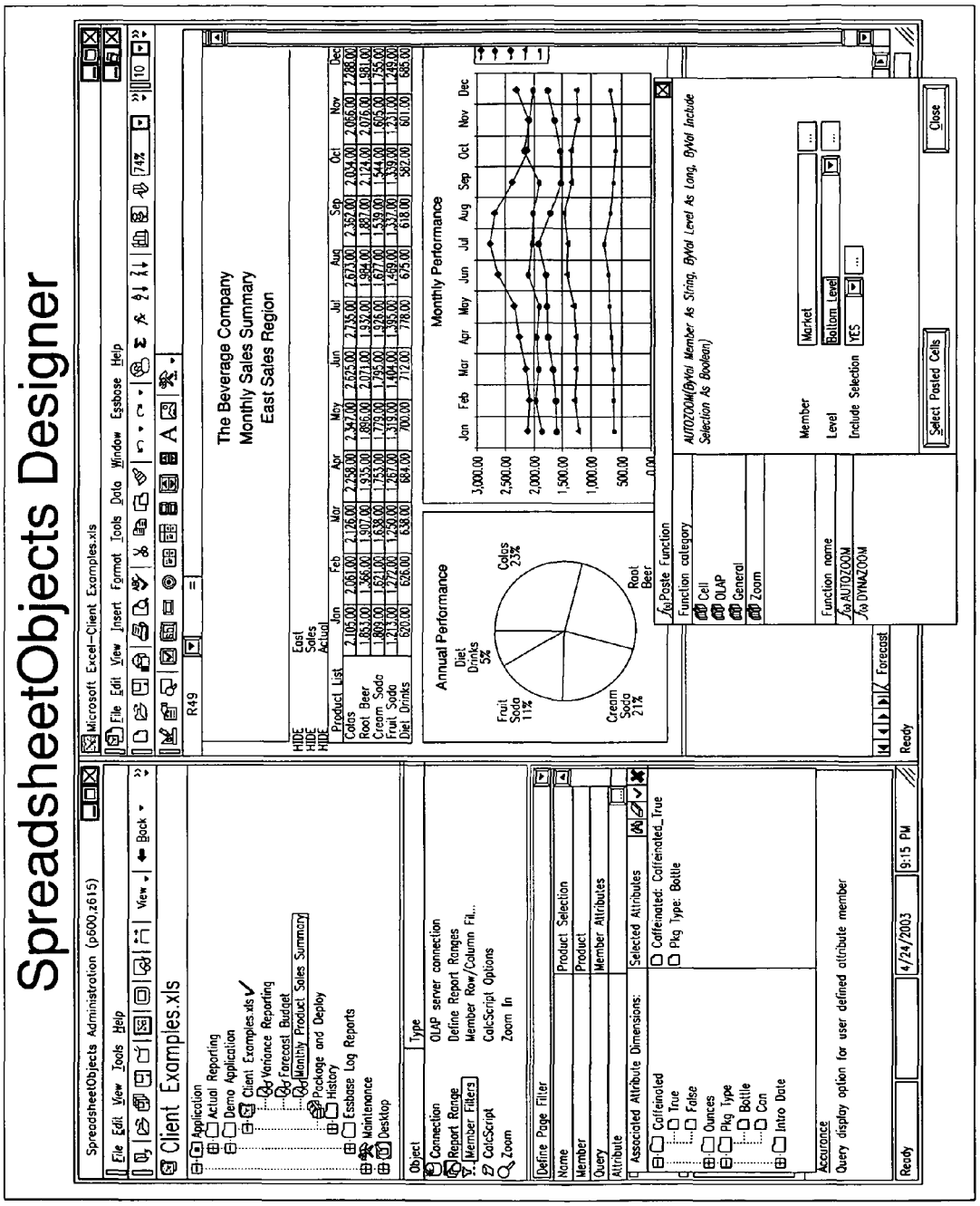
FIG. 3 is a screen shot of the preferred embodiment of the designer window of the administrator interface.

The preferred embodiment of the Designer module 104, shown in FIG. 3, allows the administrator 102 to create business applications without writing a single line of code, instead using SpreadsheetObjects powerful XLerator DLL functions.

The Designer 104 is an intuitive, graphical desktop that guides the user through the process of translating business rules into applications. The Designer 104 provides complete access to all required components to assist the administrator 102 with template and application development.

The Designer module 104 is preferably implemented as a Microsoft Windows application installed on the administrator 102 or user's computer. The administrator 102 or user creates an Excel® workbook containing presentation and formatting data and uses the Designer module 104 to create control file data, which is integrated with the workbook into a SpreadsheetObjects application 108. The control files define the source, scope, and structure of the data that will be returned from the database 136 when the application 108 is executed, as well as the deployment information. The report application 108 is created by combining the workbook with the control files.

The control data imbedded in the application 108 contains information that the client 110 uses to automatically initiate the update of the application 108 if necessary when it is opened. This process allows an administrator 102 to maintain an application 108 and guarantees that the Client 110 will automatically open the latest deployed version.

With respect to configuration management 106, both the Client 110 (User Interface) and Designer 104 applications can be classified as desktop applications with all ongoing updates managed through an automatic web/server update process.

This architecture generally provides a much richer interaction with the user than a thin client or browser-based application. The SpreadsheetObjects web/server update process modifies the conventional desktop architecture in a way that the advantages are maintained while the maintenance drawbacks are eliminated.

In a preferred embodiment, the initial SpreadsheetObjects installation requires the placement of the User Interface and Designer 104 applications on each client 110 or user's machine that requires Windows administrator privileges. Once the initial installation has been completed, however, it is automatically updated and maintained without manual action by the client 110 and does not require special Windows privileges. This is accomplished through a modular architecture that features a fixed bootstrap layer that rarely changes after the initial install and changeable layer that contains the logic subject to updates. The changeable layer is also modular so that if only a small subset of the modules needs updating, the update can be applied only to the modules that are out of date. Updates are automatically applied by logic in the bootstrap layer without the user having to log in with administrator privileges or the need to manually register Windows components.

The bootstrap layer employs logic that, if an internet 132 or network 134 connection is available, quickly compares versioning criteria to determine if the installed SpreadsheetObjects configuration is up to date. If an update is necessary the appropriate modules are downloaded and updated in the background while a status screen is shown to the user to indicate that SpreadsheetObjects is up and running and will be available for use shortly. Routine updates are usually completed within a few seconds and is primarily dependent on the speed of the internet/intranet connection. The remote site with the updated data can reside either on a web server or a network.

With respect to data access and analysis, SpreadsheetObjects provides very flexible data access and analysis capabilities through the support of a wide variety of data sources such as Hyperion Essbase OLAP, Microsoft OLAP, and/or any ODBC compliant relational database management system. The data sources can be local or remote, or a combination of the two, as long as the user has the necessary network connections and security credentials to access them. The architecture model varies depending on the combination of data sources used.

SpreadsheetObjects implements data access and updates security be enforcing the native security model for each of the databases 136 involved. Users need to have the proper security credentials to access any of the databases 136 an application references. SpreadsheetObjects presents dialogs as needed and encrypts password data that needs to be store on the local machine. Data access is restricted to whatever access has been set up by a database administrator for the user's account. This allows users with a variety of security permits to use the same application as any data a given user is not allowed to view or modify is suppressed or restricted in accordance with security profile associated with the login.

With respect to SpreadsheetObjects's file system, the client applications must contain the required set of application files in order to run successfully. Most of the application files are generated by the Designer 104 except for the actual Excel templates, which are created by the administrator 102.

The table shown in FIG. 4 defines a number of SpreadsheetObjects application files.

As far as file regions are concerned, SpreadsheetObjects application files can exist in two different regions on a user's computer; the admin region and the client region. Application files only exist in the admin region on machines that have installed the Administrator software. The SpreadsheetObjects system path (%SSO%) is set by default, though the software may be installed to any location. The folder structure beneath the default location is managed by the software and should not be altered. The admin and client regions exist beneath the SpreadsheetObjects system path.

The table shown in FIG. 5 identifies the specific deployment source folder location of each application file relative to the SpreadsheetObjects system path (%SSO%). The deployment source folder is the location of the application file that will be deployed to the repository and thus is the true production file.

The folder %SSO%\App contains source application files that are used by SpreadsheetObjects any time a new application is created. For example, if a new application named "Budget App" is created, SpreadsheetObjects will copy these files to the new region for "Budget App" and change the name of each file (excluding extension) to "Budget App". In this case, "ssoapp.xla" would be copied to %SSO%\AppBudget App\System\Budget App.xla.

The folder %SSO%\App\AppName contains the Excel template file(s), the property file associated with each Excel template file (*.ini), a temporary view definition file (appname.vws), a version control file (ssover.txt) and a temporary backup/system file (appname.adn).

The property file is generated by SpreadsheetObjects after the Excel templates are defined in the Designer 104. The view definition file is managed by the SpreadsheetObjects administrator 102 and contains information related to all worksheets that are defined in SpreadsheetObjects. This view definition file is a temporary work file and is not the view definition file that is ultimately published to the server repository. The view definition located under the "system" subfolder is the actual production file that is deployed to the server repository. The other files are managed by SpreadsheetObjects and should not be altered.

The folder %SSO%\Appl\AppName\History contains all deployment related history files. Each time a SpreadsheetObjects application is deployed, a copy of the source application files is placed in a history folder with a date/time stamp. In the event that a rollback to a previous version is required, files from any history folder can be copied back into the deployment source folders and re-deployed.

The folder %SSO%\App\AppName\Package contains the package definition file(s) for a SpreadsheetObjects application. The package file is essentially a list of source file path and name information so SpreadsheetObjects can deploy the correct source files to the server repository.

The folder %SSO%\App\AppName\System contains key SpreadsheetObjects system files including the Excel addin driver file (appname.xla), the view definition file (appname.vws), the toolbar definition file (appname.tbr), the messaging file (appname.msg), "SSO.dll" and a backup view name file (appname.bws). These files are automatically copied and renamed from their source location (%SSO%\App) when a new SpreadsheetObjects application is created. Experienced SpreadsheetObjects administrators 102 that want to customize VBA code or the toolbar definition for a specific application should apply their edits to the xla and tbr files in this folder.

Application files located in the admin region comprise the source files for any SpreadsheetObjects application 108. The deployment process to the server repository collects application files from the admin region and posts a compressed copy of these source files on the server repository. Files in the admin region should be handled like production files and backed up on a regular basis for recovery or rollback purposes. To backup the admin region, the entire folder structure is simply copied from %SSO%\App and below to a network location that is regularly backed up or to a storage device such as a CD.

The client region is created when a user accesses SpreadsheetObjects applications 108 through the client viewer. Each application 108 that is run on the client machine creates a subfolder under the %SSO%\%USER%\Client folder.

The name of the subfolder is the same as the application description that was defined by the administrator 102 during the package and deployment process. This is usually different than the system name of the application 108 which is the name first assigned to the application 108 when it was created. It is also the same as the application folder name within the admin region on the administrator's machine.

The name of the admin region folder name is shown in the top pane. The name of the client region name is shown in the bottom pane. The client region name is set by the administrator 102 during the package and deployment process and can be changed at any time. Typically, the client region name is more descriptive than the admin region name to make the application name intuitive for the end users.

Unlike the admin region, the client region contains all SpreadsheetObjects application files in a single folder. These files should be considered temporary and will be overwritten any time a new version of a file is published to the server repository.

All source application files that are currently deployed to the server repository are present in this folder. Additionally, the following files are present: cascade.ini, that contains user view and member runtime selection information; demo.txt which always has the same name as the deployment folder name on the server repository and contains the information required to convert files from their format in the server repository to the format required for the client region; and sso.sec that is the SpreadsheetObjects security file that contains user login information and server repository source information.

A SpreadsheetObjects administrator 102 typically works on custom VBA code by directly running the xla driver addin from within the client region. This is to aid in the VBA debug process since the application cannot actually be executed from the admin region. It is important to always transfer (copy) any edited source files in the client region back to the admin region for re-deployment so any changes are not lost. Always make backup copies of any source files before any modifications are made. An application 108 should be launched directly from the xla driver file in the client region only by an experienced administrator 102 and only for debugging or customization purposes. In all other instances, applications should be launched using the SpreadsheetObjects Viewer.

In the event that multiple people are responsible for deploying the same SpreadsheetObjects application 108, care must be taken to ensure that the latest production files are not overwritten.

The default SpreadsheetObjects deployment process begins with the source application files that are located on the developer's machine (e.g., Excel templates, toolbar configuration, addin driver, etc). Upon deployment, these source files are transferred to the server repository. If another developer, from another machine, deploys the same application without putting the source files on their system, the most recent production files may be overwritten on the server repository. To ensure that the developer is always working with the most recent production files in this scenario, the steps as shown below preferably should be performed prior to changing any source files for deployment:

Run the SSO Viewer 124 to automatically bring the latest files from the server repository to the administrator's machine. The files will be located in the client region on your PC (%SSO%\Client\AppName). If there are newer source files located in the client region then it is preferably to copy those files to a safe location prior to running the Viewer 124. Once the Viewer 124 has downloaded the newest files from the deployment server 105, the newer source files on the system may be copied back into the client region.

Copy the newest source files from the client region to the admin region using Windows Explorer. The admin region is located at %SSO%\App\AppName. Copy the file(s) to the correct subfolder(s) as specified in the technical reference.

Re-deploy the application using the SpreadsheetObjects Designer 104.

SpreadsheetObjects packages must be deployed and security must be set before end users can begin using the system. The steps below summarize at a high-level the tasks that must be completed prior to using the system:

Create deployment repository
Set security for deployment user
Deploy a SpreadsheetObjects package
Set end user security for deployment repository
Run the client to access the SpreadsheetObjects package The deployment repository is a centrally located folder that may reside on the Essbase server (default) or any network server. It is important that all end users have a secure connection (e.g., VPN, intranet) to gain access to the server that contains the deployment repository. The deployment repository does not contain any executable programs; rather it serves as a storage location for the required SpreadsheetObjects package files that are ultimately accessed by the end users. SpreadsheetObjects package files are compressed and pushed to the deployment repository when the deployment user deploys or updates a SpreadsheetObjects package. These files are downloaded automatically by end user machines as updates and new versions are made available.

The OLAP deployment repository preferably resides in an Essbase database folder. This database does not contain traditional Essbase files and does not need to be loaded in memory on the server. Each deployed SpreadsheetObjects package must be deployed to its own database.

The network deployment repository resides in any standard Windows folder located either on a network drive or a local drive. Each deployed SpreadsheetObjects package must be deployed to its own folder.

SpreadsheetObjects does not contain its own security layer but instead relies on security settings on the OLAP server to manage client access to the system. There are three different types of security settings: deployment user access, application-level access and member-level access. The different types of security settings are described below. Preferably, the deployment user has special security settings to control the SpreadsheetObjects deployment process.

The deployment user on Essbase must have a minimum of database designer access to the deployment repository. In this embodiment, the user must also have Essbase "Create/Delete Users, Groups" privilege if you intend to use security filters to change end user dimension views. The deployment user is used occasionally by the client to read security filter contents. This is required when security filters are assigned at the group level and transferred to individual users. This is required because Essbase usernames do not natively have access to read security filters that are inherited from a group level—a limitation of the Essbase API layer. End users are not aware of this deployment user and do not have access to the deployment user's password. The deployment user on the network must have a minimum of write access to the deployment repository folder.

The application security layer determines which applications are available to the end user through the client viewer. This security layer allows administrators 102 to grant access by user to specific SpreadsheetObjects application. Setting this security layer differs by the type of deployment repository.

To grant access to a SpreadsheetObjects application 108 using the OLAP deployment repository, the administrator 102 (or in some cases, the OLAP server administrator) must grant standard Essbase read access to the specific user for the deployment repository (database). This can be done using LumenSoft ServerManager™ or Hyperion Application Manager. Security access can be set at the user or group level. Please refer to Hyperion's technical documentation on setting Essbase security for related questions.

To grant access using the network deployment repository, the administrator 102 (or in some cases, the network administrator) must grant standard read access to the specific user for the deployment repository (network folder). End users or clients 110 do not need to have the same drive mappings to use the same network repository. If different drive mappings are an issue, be sure to deploy the package using Universal or Uniform Naming Convention (UNC) (e.g. "servernnamedeployfolder").

The member security layer defines which members a user will see when selecting filter options through the client viewer. This security layer is enabled by setting up Essbase security filters for individual users or groups on Essbase. The security filters must contain filter lines that comply with a certain format to be properly read by SpreadsheetObjects. Filter lines must contain a single member specification and one of the following macro commands to work properly: @CHILDREN; @ICHILDREN; @DESCENDANTS; @DESCENDANTS. Security filters contain additional, unrelated filter lines. Any filter lines that do not match the required format for SpreadsheetObjects will be ignored by the system.

The deployment impact table shown in FIG. 6 describes different scenarios and the impacted application files that must be re-deployed to the server repository to properly update the end user's machine.

Although the present application incorporates by reference certain copyrighted material, including the software source code and the Technical Reference manual, no license to use or produce these copyrighted materials is granted by virtue of this application, other than to the extent such materials are copied pursuant to an examination of a copy of this application. All other rights are reserved.

The invention claimed is:

1. A computer apparatus that performs a method of generating and managing templates for a spreadsheet program over a computer network, the method comprising:

using an administrator interface module operably connected to a server computer to design a plurality of templates for the spreadsheet program based at least in part on existing templates, functions and modeling workbooks of the spreadsheet program without any code being written;

making a library of dynamic link library (DLL) worksheet functions corresponding to the plurality of templates available over the computer network; and using a user interface module executing on a client computer having a first explorer window in which a user views and selects the DLL worksheet functions and a second viewer window in which the user interacts with the spreadsheet program and selectively incorporates one or more of selected DLL worksheet functions;

wherein the user interface module is implemented using a bootstrap layer that is generally fixed and a changeable layer that is generally updateable and wherein the method further comprises a step of automatically having the user interface module check for updates by using the bootstrap layer to check for and download over a network and install updates to the changeable layer;

wherein the step of using the administrator interface module comprises:

creating a spreadsheet workbook containing presentation and formatting data;

using the administrator interface module to create control files which are integrated with the spreadsheet workbook into a report application as one of the plurality of templates, the control flies defining a source, scope, and structure of data to be returned from a networked database when the report application is executed and deployment information for the report application; and creating the report application by integrating the spreadsheet workbook with the control files.

2. The method of claim 1 wherein each DLL worksheet functions encapsulates at least a plurality of standard spreadsheet functions for the spreadsheet program.

3. The method of claim 1 wherein the spreadsheet program is Microsoft Excel.

4. The method of claim 1 wherein the DLL worksheet functions are ActiveX DLLs and a step of using the user interface dynamically registers the ActiveX DLLs when a report application is started.

5. A computerized system for generating and managing interactive report templates for a spreadsheet program over a computer network, the system comprising:

a designer program module that enables an administrator to design report templates and applications as dynamic link library (DLL) worksheet functions for the spreadsheet program without the need to write software code;
a client computer;
a client interface that enables said client computer to view and manipulate the report templates and applications through a use of an explorer program module and that executes the spreadsheet program in a viewer program module that is capable of selectively starting one or more of the report templates and applications;
a deployment server computer system that stores a plurality of report templates and applications designed by the designer program module and distributes report templates and applications over the network in response to registration requests said client interface that has started a report application or template; and
a database management system that provides access to local or remote data sources referenced by the report templates and applications;
wherein a user interface module of client interface is implemented using a bootstrap layer that is generally fixed and changeable layer that is generally updateable and wherein the method further comprises step of automatically having the user interface module to check for updates by using the bootstrap layer to check for and download over a network and install updates to the changeable layer;
wherein the step of using an administrator interface module of the designer program module comprises:
creating a spreadsheet workbook containing presentation and formatting data; using the administrator interface module to create control files which are integrated with the spreadsheet workbook into a report application as one of a plurality of templates, the control flies defining a source, scope, and structure of data to be returned from a networked database when the report application is executed and deployment information for the report application; and
creating the report application by integrating the spreadsheet workbook with the control files.

6. The system of claim 5 further comprising: an administrator interface that controls development of the report templates and applications, manages deployment of the report templates and applications to a deployment server computer system, and controls client access to the report templates and applications.

7. A computer-readable medium storing thereon computer-readable instructions for generating and managing templates for a spreadsheet program, comprising:
instructions for using an administrator interface module operably connected to a server computer to design a plurality of templates for the spreadsheet program based at least in part on existing templates, functions and modeling workbooks of the spreadsheet program without any code being written;
instructions for making a library of dynamic link library (DLL) worksheet functions corresponding to the plurality of templates available over the computer network; and
instructions for using a user interface module executing on a client computer having a first explorer window in which a user views and selects the DLL worksheet functions and a second viewer window in which the user interacts with the spreadsheet program and selectively incorporates one or more of the selected DLL worksheet functions;
wherein the instructions for using the administrator interface module comprises:

instructions for creating a spreadsheet workbook containing presentation and formatting data;
instructions for using the administrator interface module to create control files, which are integrated with the spreadsheet workbook into a report application as one of the plurality of templates, the control flies defining a source, scope, and structure of data to be returned from a networked database when the report application is executed and deployment information for the report application; and
instructions for creating the report application by integrating the spreadsheet workbook with the control files.

8. The computer-readable medium of claim 7 wherein each DLL worksheet functions encapsulates at least a plurality of standard spreadsheet functions for the spreadsheet program.

9. The computer-readable medium of claim 7 wherein the spreadsheet program is Microsoft Excel.

10. The computer-readable medium of claim 7 wherein the user interface module is implemented using a bootstrap layer that is generally fixed and a changeable layer that is generally updateable and wherein the computer-readable medium further comprises instructions for automatically having the user interface module to check for updates by using the bootstrap layer to check for and download over the network and install updates to the changeable layer.

11. The computer-readable medium of claim 7 wherein the DLL worksheet functions arc ActivcX DLLs and the instructions for using the user interface dynamically registers the AcfivcX DLLs when a report application is started.

12. A computerized system for generating and managing interactive report templates for a spreadsheet program over a computer network, the system comprising:
a designer program module that enables an administrator to design report templates and applications as dynamic link library (DLL) worksheet functions for the spreadsheet program without the need to write software code;
a client computer;
a client interface that enables said client computer to view and manipulate the report templates and applications through a use of an explorer program module and that executes the spreadsheet program in a viewer program module that is capable of selectively starting one or more of the report templates and applications;
a deployment server computer system that stores a plurality of report templates and applications designed by the designer program module and distributes report templates and applications over a network in response to registration requests said client interface that has started a report application or template; and
a database management system that provides access to local or remote data sources referenced by the report templates and applications;
wherein the instructions for using an administrator interface module of the client computer comprises:
instructions for creating a spreadsheet workbook containing presentation and formatting data;
instructions for using the administrator interface module to create control files, which are integrated with the spreadsheet workbook into a report application as one of a plurality of templates, the control flies defining a source, scope, and structure of data to be returned from a networked database when the report application is executed and deployment information for the report application; and
instructions for creating the report application by integrating the spreadsheet workbook with the control files.

* * * * *